United States Patent [19]

Busboom

[11] 4,441,512
[45] Apr. 10, 1984

[54] COMBINED AIR INTAKE SCREEN AND ACCESS DOOR FOR COMBINE

[75] Inventor: Garry W. Busboom, Independence, Mo.

[73] Assignee: Allis-Chalmers Corporation, Milwaukee, Wis.

[21] Appl. No.: 362,831

[22] Filed: Mar. 29, 1982

[51] Int. Cl.³ .............................................. A01F 12/48
[52] U.S. Cl. ................................. 130/27 Z; 130/27 R
[58] Field of Search ........................... 130/27 Z, 27 R; 56/14.6, 13.3, 16.5

[56] References Cited

U.S. PATENT DOCUMENTS 3,402,720  9/1968  Rowland-Hill .................. 130/27 R Primary Examiner—Jay N. Eskovitz
Attorney, Agent, or Firm—Charles L. Schwab

[57] ABSTRACT

A double door fan inlet screen (56, 57) on the bottom of a combine serves to screen foreign material from air flowing to a fan (46) and provide access for service personnel to an interior cavity (103) of the combine. The screen doors (56, 57) are held in their closed position by a latch mechanism (74, 79) which is releasable by operation of a rod (94) having a handle portion (97') extending to one lateral side of the combine.

4 Claims, 6 Drawing Figures

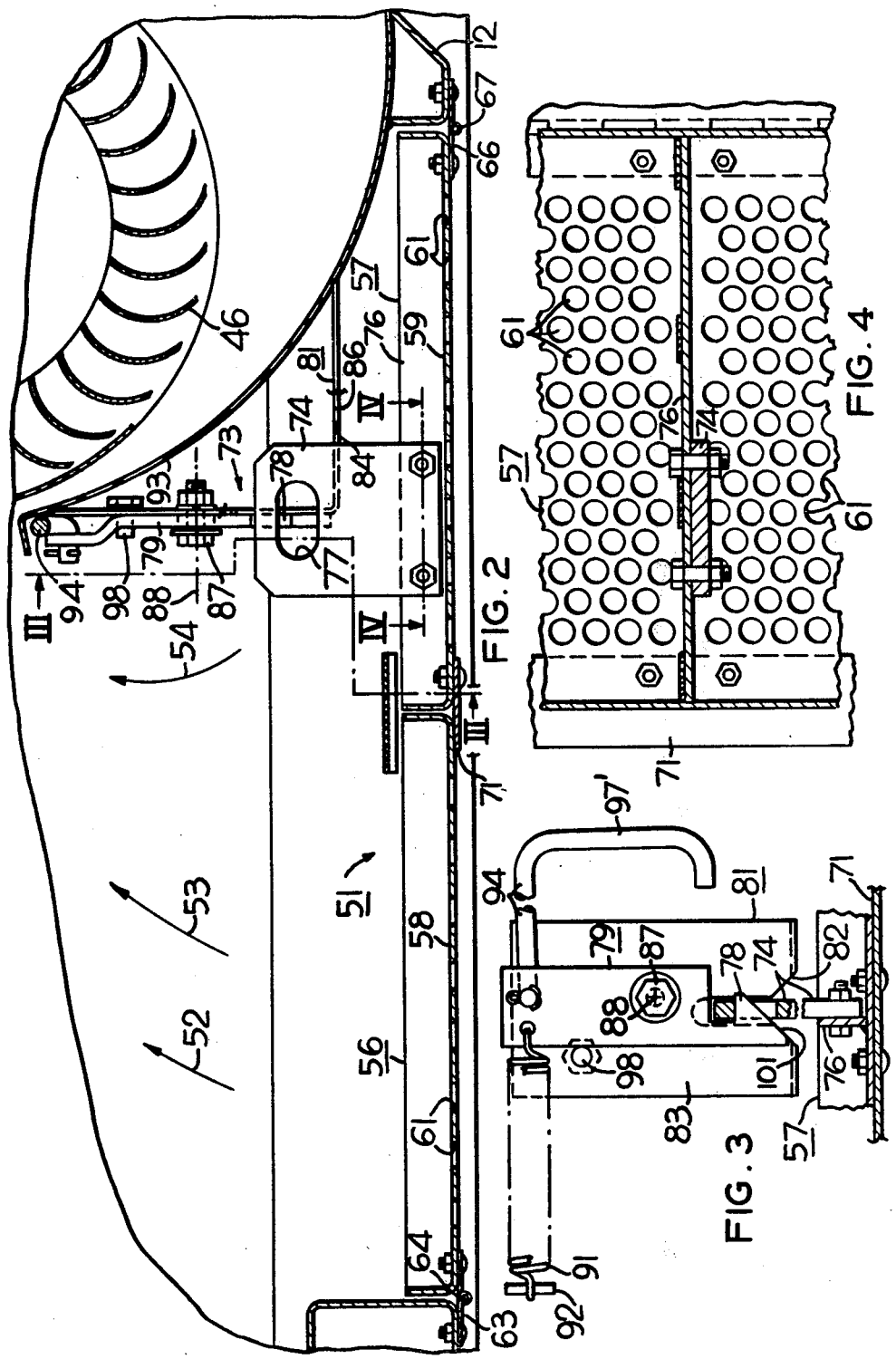

COMBINED AIR INTAKE SCREEN AND ACCESS DOOR FOR COMBINE

BACKGROUND OF THE INVENTION

1. Technical Field

This invention relates to a combine harvester utilizing a cleaning fan and particularly to the provision of a double-door intake screen for such a fan which also serves as an access door to service components of the combine from an interior cavity.

2. Prior Art

Heretofore an access screen has been used at the bottom of a combine main frame for screening out large pieces of crop material and the like. This horizontally positioned door was downwardly removable as a unit after releasable fasteners were released. Also heretofore, a fan intake screen has been used which slides horizontally on a guide mechanism between open and close positions. In opening the prior screens, the trash accummulated on the top of the screen often ended up being dumped on the operator who, necessarily, was beneath the combine to open the screens. In some instances, in opening the horizontally slidable screen it will become jammed on the trash on top of the screen and the trash must be removed before the screen can be slid horizontally to its full open position.

BRIEF DESCRIPTION OF THE INVENTION

The present invention includes the use of a pair of double door screens which are positioned longitudinally in side by side relation to one another and are hinged at their remote edges to the underside of the main frame of the combine. The doors are held in a latched position by a latch which engages one of the two doors. A lip on the latched door engages an edge of the other door to hold it in its closed position. The latch mechanism includes a manually operable handle at one lateral side of the combine which can be operated without going beneath the combine. Upon the latch being moved to an open position, the doors swing downwardly to a generally vertical position dumping any debris that may have accummulated on the upper side of the screen. Although the screen is intended to prevent debris from entering the cavity above a double door screen, nevertheless, materials do accumulate on the upper side of the screen. When the doors have been opened the operator can enter the opening and move into the cavity between the side walls of the combine where he can inspect, service and repair components accessible from the cavity such as the change speed transmission, the feeder conveyor and the transverse fan.

The invention finds particular utility in a harvester having a main frame with laterally spaced vertical side walls, a pair of drive wheels and associated change speed transmission on the forward end of the main frame, a pair of steerable wheels in supporting relation to the rear end of the main frame, a transverse header, a feeder operatively interconnecting the header and the front of the main frame and including a crop conveying means, a crop processor at an elevated position on said main frame and including a processor housing, a conveyor disposed above the transmission operable to move crop material from the crop conveying means to the crop processor, and a transverse fan and duct walls spaced rearwardly of said transmission and below the conveyor and processor with the fan disposed between and rotatably supported on the side walls for rotation about a transverse horizontal axis, with the side walls, conveyor, processor housing, transverse fan and ductwork defining an interior air passageway and service cavity. In this environment, I propose to use a combined intake air screen and access means to the interior cavity including a pair of downwardly swingable foraminous doors disposed in side-by-side relation to one another in their closed positions wherein they are substantially horizontally coplanar. The doors are pivotally connected to the main frame on longitudinally spaced transverse axes for vertical swinging movement between their horizontal closed positions to downwardly extending vertical open positions. Manually operable releasable retaining means hold the doors in their closed positions, the doors swinging downwardly when the retaining means is released thereby dumping trash from on top of the doors and exposing a bottom opening for human access to the cavity for inspection and servicing of components accessible therefrom.

BRIEF DESCRIPTION OF THE DRAWINGS

One embodiment of the invention is shown in the drawings in which:

FIG. 2 is a vertical section through the screen and a portion of the transverse fan showing the relationship between the screen doors and a latch mechanism;

FIG. 3 is a view taken along the line III—III in FIG. 2;

FIG. 4 is a view taken along the line IV—IV in FIG. 2;

DETAILED DESCRIPTION OF THE DRAWINGS

Figure 1:
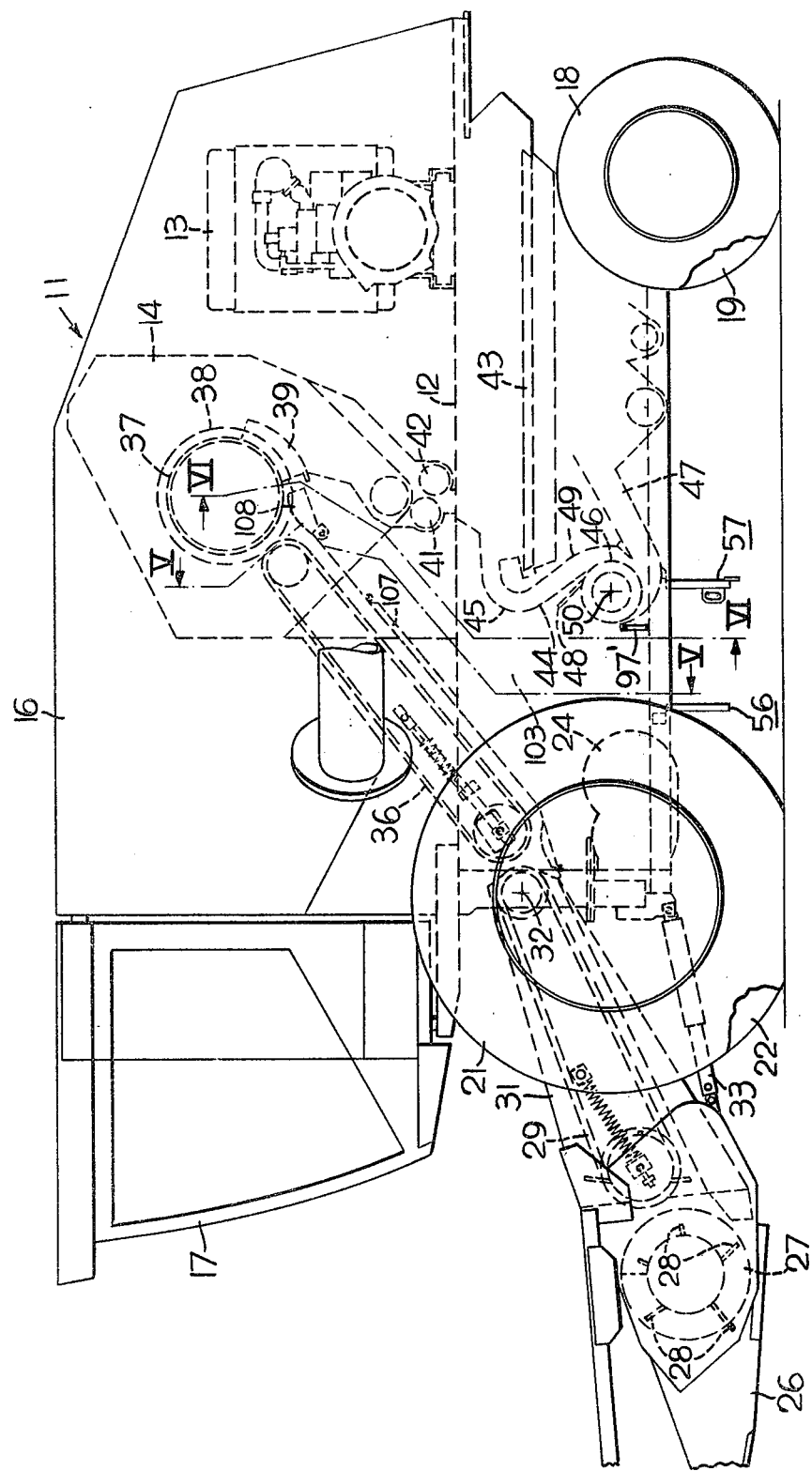
FIG. 1 is a side view of a combine showing the double screen doors in an open position.
Figure 5:
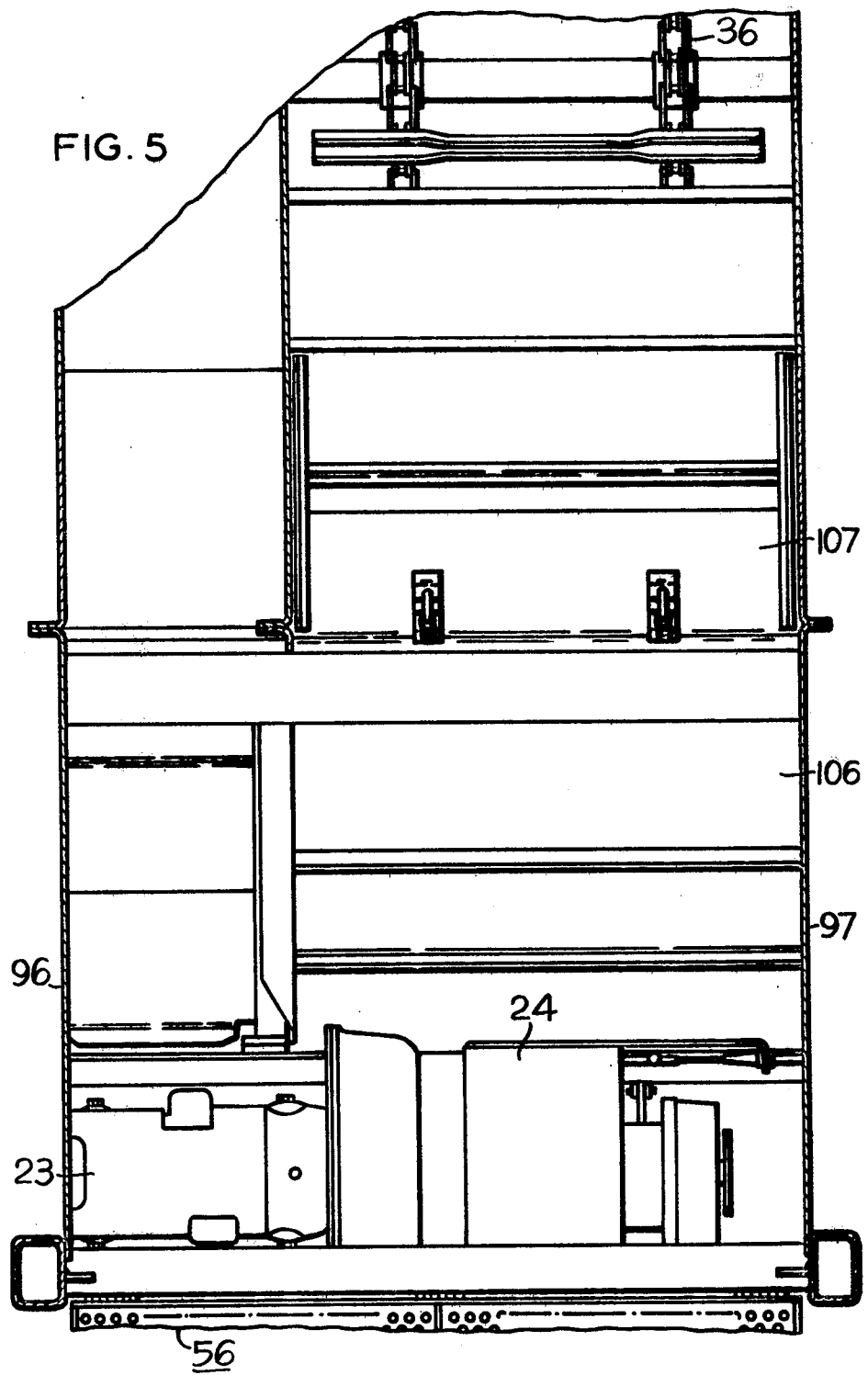
FIG. 5 is a view taken along the line V—V in FIG. 1.
Figure 6:
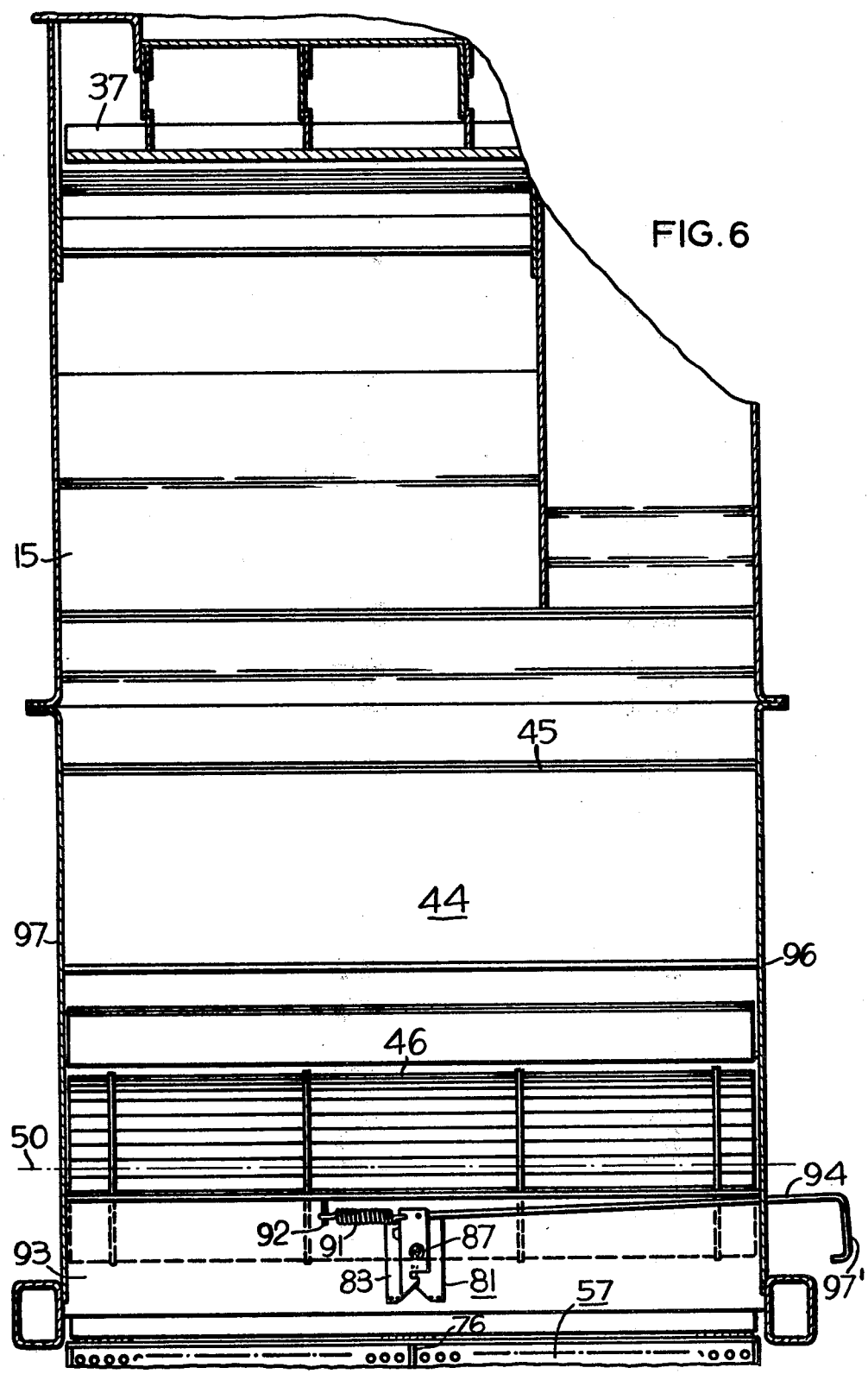
FIG. 6 is a view taken along the line VI—VI in FIG. 1.

Referring to FIGS. 1, 5 and 6, the combine 11 in which the present invention is incorporated includes a main frame 12 on which an engine 13, a processor 14, a grain tank 16 and an operator's cab 17 are mounted. The main frame 12 is supported at its rear end by a pair of steerable wheels 18, 19 and at its front end by a pair of drive wheels 21, 22 driven by the engine through a power train which includes a hydraulic motor 23 and a change speed transmission 24. The combine 11 includes a header 26 having a transverse auger 27 which conveys cut crop material to a central part of the header where retractable fingers 28 on the auger 27 move the cut crop material rearwardly to a endless chain slat conveyor 29 within a conveyor housing 31. The conveyor housing 31 is secured at its front end to the header 26 and has its rear end pivotally connected on a transverse axis 32 to the frame 12 for vertical swinging movement under the control of an expansible and contractible hydraulic jack 33 interconnected between the conveyor housing 31 and the main frame 12. The combine also includes an upper feeder conveyor 36 which receives material from the lower conveyor 29 and delivers it to the rotating rotor 37 of the processor 14. The grain or seed separated from the crop material as it moves through the processor 14 is discharged through a perforated screen 38 and a concave 39 to a pair of accelerator rolls 41 and 42 which accelerate the material downwardly to a grain pan of the cleaning shoe assembly 43 across a rearwardly directed air stream emerging from an upper air duct 44 defined by duct walls 45, 49 and side walls 96, 97. A transverse fan 46, disposed between and supported on a transverse axis 50 by the side walls 96, 97, delivers air to the upper air duct 44 and to an air duct 47 conveying air to the underside of the cleaning shoe 43. Inflow of air to the transverse fan 46 is varied by a movable transverse vane 48.

Referring also the other Figures of the drawings, air for the transverse fan enters through a double door screen assembly 51 and as shown in FIG. 2, the air moves upwardly as indicated by the arrows 52, 53, 54. A pair of coplanar foraminous screen doors 56 and 57 of the double door screen assembly 51 include horizontal walls 58, 59 which are perforated, as by punching, to provide rather large openings 61. The side-by-side screen doors 56, 57 serve to screen out relatively large pieces of stalks and straw or other debris encountered in traversing the field being harvested. The front screen door 56 is pivotally connected by a hinge 63 on a transverse horizontal pivot axis 64 for vertical swinging movement between the horizontal closed position in which it is shown in FIG. 2 to a generally vertical downwardly slung position as shown in FIG. 1. Similarly, the screen door 57 is pivotally connected to the main frame 12 by a hinge 66 for vertical swinging movement about a transverse axis 67. As shown in FIG. 2 the adjacent ends of the front door 56 and the rear door 57 are maintained in their desired position adjacent to one another by a bracket 71 bolted to the underside of the rear door 57 and extending forwardly below the rear end of door 56 so as to be in a vertically confronting and abutting relationship thereto.

The rear door 57 is held in its horizontal closed position, as illustrated in FIG. 2, by a latch mechanism 73 which includes a fixed latch part 74 bolted to the door 57 at its laterally central point, namely vertical flange 76. The latch part 74 includes a longitudinaly elongated opening 77 which is engaged by a hook portion 78 of a shiftable latch part 79 pivotally connected to a bracket 81 on the main frame 12. A funnel shaped notch 82 is formed in the vertical portion 83 of the bracket 81 and a rearwardly extending notch 84 is formed in the horizontal portion 86 of the bracket 81. The shiftable latch part 79 is pivotally connected to the vertical wall 83 of the bracket 81 by a pivot bolt 87 for pivotal movement about a longitudinal horizontal axis 88. As shown in FIG. 3, a tension spring 91 for holding the latch part 79 in a latched position has one end connected to a bracket 92 secured to a fan housing wall 93 and has its other end connected to the upper part of the pivotable latch part 79. Also connected to the upper end of the shiftable latch part 79 is a laterally extending motion transmitting means in the form of a link or operating rod 94 which extends through an appropriate opening in the main frame sidewall 96 and presents a manually operable hand grip portion or handle 97' disposed on the laterally outer side of the sidewall 96 so that the operator, by pulling outwardly on the handle 97' of the control rod 94, can unlatch the door 57 which will result in the doors 57, 56 swinging downwardly by gravity to their open position illustrated in FIG. 1. The lower end of the shiftable latch part 79 has a camming surface 101 which is engageable with the upper edge of latch part 74 when the door 57 is swung upwardly to its closed position. Thus the doors may be closed without pulling on the latch operating handle 97. Counterclockwise rotation of the latch part 79 is limited by an abutment pin 98 secured to the bracket 81.

When the doors 56 and 57 are opened, it should be noted they do not strike the ground. Also, when opened, they provide access to a rather large fan air passageway and service cavity 103 in the interior of the combine. This interior cavity 103 is defined at its laterally opposite sides by sidewalls 96, 97. As shown in FIGS. 1 and 6, the rear of the cavity 103 is defined by the transverse fan 46 fan housing 93, the front wall of the air passageway 44 and housing 15 of the processor 14. The front of the cavity 103 is defined, as shown in FIGS. 1 and 5, by the hydraulic motor 23, the transmission 24, and the floor 106 of the upper conveyor 36. The conveyor floor 106 includes an access door 107.

The cavity 103 provides space for repair and service personnel to inspect, service and repair components accessible from the interior of the cavity such as the hydraulic motor 23, the change speed mechanical transmission 24, the transverse fan 46 and its intake choke 48, and the upper conveyor 36 by way of the service door 107. The rock door 108 may also be serviced from the cavity 103.

This invention permits fan screen doors 56, 57 to be quickly and easily opened from the side of the combine by simply pulling on the handle 97' of the latch operating rod 94. Foreign material on the upper side of the screen doors 56, 57, which may include one or more rocks should the rock door 108 have opened, will fall to the ground without discomfort to the operator. This invention also permits the operator to swing the doors 56, 57 to their closed, latched position without having to position himself beneath the combine.

The embodiments of the invention in which an exclusive property or privilege is claimed are defined as follows:

1. In a harvester including a main frame with laterally spaced vertical side walls, a pair of drive wheels and associated change speed transmission on the forward end of the main frame, a pair of steerable wheels in supporting relation to the rear end of the main frame, a transverse header, a feeder operatively interconnecting the header and the front of the main frame and including a crop conveying means, a crop processor at an elevated position on said main frame and including a processor housing, a conveyor disposed above the transmission operable to move crop material from the crop conveying means to the crop processor, and a transverse fan and duct walls spaced rearwardly of said transmission and below the conveyor and processor with the fan disposed between and rotatably supported on the side walls for rotation about a transverse horizontal axis, the side walls, conveyor, processor housing, transverse fan and ductwork defining an interior air passageway and service cavity, the improvement comprising:

a combined intake air screen and access means to the interior cavity including
        a pair of downwardly swingable foraminous doors disposed in side-by-side relation to one another in their closed positions wherein they are substantially horizontally coplanar, said doors being pivotally connected to the main frame on longitudinally spaced transverse axes for vertical swinging movement between their horizontal closed positions to downwardly extending vertical open positions, and manually operable releasable retaining means operable to hold said doors in their closed positions, said doors swinging downwardly when said retaining means is released thereby exposing a bottom opening for human access to said cavity for inspection and servicing of components accessible from within said cavity.

2. The combination of claim 1 wherein said releasable retaining means includes a latching mechanism having a movable latch part shiftable between a latched position and an unlatched position, means biasing said movable latch part toward its latched position and a motion transmitting means connected to said movable latch part including a hand grip portion at a laterally outer side of one of said side walls.

3. The combination of claim 2 wherein said latching mechanism includes a latch part on a laterally intermediate portion of one of said doors engageable by said movable latch part.

4. The combination of claim 3 wherein said one door includes a longitudinally extending lip at one edge in vertically upward thrust transmitting engagement with an adjacent edge of the other door when said doors are in their closed positions.

* * * * *